(12) United States Patent
Zhao et al.

(10) Patent No.: US 10,200,141 B2
(45) Date of Patent: Feb. 5, 2019

(54) INTERFERENCE CANCELLATION METHOD AND APPARATUS FOR ENHANCED PHYSICAL DOWNLINK CONTROL CHANNEL

(75) Inventors: Yan Zhao, Shanghai (CN); Xiaobo Zhang, Shanghai (CN); Huan Sun, Shanghai (CN)

(73) Assignee: ALCATEL LUCENT, Paris (FR)

( * ) Notice: Subject to any disclaimer, the term of this patent is extended or adjusted under 35 U.S.C. 154(b) by 1016 days.

(21) Appl. No.: 14/239,492

(22) PCT Filed: Jul. 31, 2012

(86) PCT No.: PCT/IB2012/001570
§ 371 (c)(1),
(2), (4) Date: Feb. 18, 2014

(87) PCT Pub. No.: WO2013/024336
PCT Pub. Date: Feb. 21, 2013

(65) Prior Publication Data
US 2014/0192783 A1    Jul. 10, 2014

(30) Foreign Application Priority Data

Aug. 17, 2011    (CN) .......................... 2011 1 0236651

(51) Int. Cl.
*H04L 1/00* (2006.01)
*H04J 13/18* (2011.01)
(Continued)

(52) U.S. Cl.
CPC ............ *H04J 13/18* (2013.01); *H04J 11/005* (2013.01); *H04J 11/0026* (2013.01); *H04W 24/02* (2013.01)

(58) Field of Classification Search
None
See application file for complete search history.

(56) References Cited

U.S. PATENT DOCUMENTS 9,055,576 B2 * 6/2015 Chen ................... H04W 72/042
2008/0310540 A1 12/2008 Tiirola et al.
(Continued)

FOREIGN PATENT DOCUMENTS

CN     101374340 A    2/2009
CN     101488797 A    7/2009
(Continued)

OTHER PUBLICATIONS

English Bibliography for PCT Patent Application No. WO 2011/120429, published Oct. 6, 2011, printed from Thomson Innovation on Mar. 12, 2015, 4 pp.
(Continued)

*Primary Examiner* — Willie J Daniel, Jr.
(74) *Attorney, Agent, or Firm* — Fay Sharpe LLP

(57) ABSTRACT

Embodiments of the present invention provide an interference cancellation method for an enhanced physical downlink control channel E-PDCCH, comprising steps of: (1) allocating different orthogonal covering code OCC sequences to different cells and/or different users; and (2) combining a plurality of control channel elements CCEs constituting one PDCCH with a cell-specific OCC sequence and/or a user-specific OCC sequence respectively, so as to enable a user equipment to cancel interference on the PDCCH.

20 Claims, 4 Drawing Sheets

(51) Int. Cl.
*H04J 11/00* (2006.01)
*H04W 24/02* (2009.01)

(56) References Cited

U.S. PATENT DOCUMENTS

| | | |
|---|---|---|
| 2011/0085513 A1 | 4/2011 | Chen et al. |
| 2011/0164489 A1 | 7/2011 | Papasakellariou et al. |
| 2011/0243066 A1* | 10/2011 | Nayeb Nazar et al. ..................... H04L 1/007 370/328 |
| 2012/0113795 A1 | 5/2012 | Ko et al. |

FOREIGN PATENT DOCUMENTS

| | | |
|---|---|---|
| CN | 101651986 A | 2/2010 |
| CN | 101755409 A | 6/2010 |
| CN | 101841819 A | 9/2010 |
| CN | 102111249 A | 6/2011 |
| CN | 102123014 A | 7/2011 |
| WO | 2011008062 A2 | 1/2011 |
| WO | WO 2011/034358 A2 | 3/2011 |
| WO | WO 2011/083986 A2 | 7/2011 |
| WO | 2011120429 A1 | 10/2011 |

OTHER PUBLICATIONS

R1-094961, LTE-Advanced Rapporteur (NTT DOCOMO), 3GPP TSG RAN WG1 #59, Nov. 9-13, 2009, Jeju, Korea, 3 pp.
R1-112289, The aperiodic sounding using non-precoded DMRS, 3GPP TSG RAN1 #66, Aug. 22-26, 2011, Athens, Greece, 4 pp.
PCT Pat. App. No. PCT/IB2012/001570, Written Opinion of the International Searching Authority, dated Jan. 31, 2013, 3 pp.
Dahlman et al.: 4G LTE/LTE-Advanced for Mobile Broadband, Chapter 10, Downlink Physical Layer Processing, Academic Press (paperback), Mar. 29, 2011, pp. 143-202.
R1-112295, Standardization Impact of UL-CoMP, 3GPP TSG RAN WG1 Meeting #66, Aug. 22-26, 2011, Athens, Greece, 5 pp.
R1-102388, Consideration on DM-RS design for UL MIMO in LTE-A, 3GPP TSG RAN WG1 Meeting #60bis, Apr. 12-16, 2010, Beijing, China, 5 pp.
R1-101133: Views on Remaining Issues on Uplink DM-RS for LTE-A, 3GPP TSG RAN WG1 Meeting #60, Feb. 22-26, 2010, San Francisco, 7 pp.
International Search Report for PCT/IB2012/001570 dated Jan. 31, 2013.
Peng et al., "Multi-User Resource Allocation for Downlink Control Channel in LTE Systems", 2010 IEEE 21st International Symposium on Personal Indoor and Mobile Radio Communications, pp. 1499-1503.
Takeda et al.; "Investigation of Two-Dimensional Orthogonal Sequence Mapping to Multi-Layer Reference Signal for LTE-Advanced Downlink", 2010 IEEE, 72nd Vehicular Technology Conference Fall (VTC 201-Fall), 5 pp.
R1-110110, OCC Remapping for PUCCH Format 3, 3GPP TSG RAN WG1 Meeting #63bis, Jan. 17-21, 2011, Dublin, Ireland, 5 pp.
3GPP TS 36.211, V10.2.0 (Jun. 2011), LTE; 3GPP TS 36.211 version 10.2.0 Release 10), Evolved Universal Terrestrial Radio Access (E-UTRA), Physical Channels and Modulation, 105 pp.
3GPP TS 36.213 V10.2.0 (Jun. 2011), 3rd Generation Partnership Project; Technical Specification Group Radio Access Network; Evolved Universal Terrestrial Radio Access (E-UTRA); Physical Layer Procedures (Release 10), 120 pp.
EP Patent Application No. 12823751 (PCT/IB2012/001570), European Search Report, dated Apr. 2, 2015, 8 pp.
English Bibliography for Chinese Patent Application Publication No. CN101488797A, published Jul. 22, 2009, printed from Thomson Innovation on Apr. 21, 2015, 3 pp.
English Bibliography for Chinese Patent Application Publication No. CN101651986A, published Feb. 17, 2010, printed from Thomson Innovation on Apr. 21, 2015, 3 pp.
English Bibliography for Chinese Patent Application Publication No. CN101755409A, published Jun. 23, 2010, printed from Thomson Innovation on Apr. 21, 2015, 4 pp.
English Bibliography for Chinese Patent Application Publication No. CN101841819A, published Sep. 22, 2010, printed from Thomson Innovation on Apr. 21, 2015, 3 pp.
English Bibliography for Chinese Patent Application Publication No. CN102111249A, published Jun. 29, 2011, printed from Thomson Innovation on Apr. 21, 2015, 3 pp.
English Bibliography for PCT Patent Publication Application WO 2011/008062A2, published Jan. 20, 2011, printed from Thomson Innovation on Apr. 21, 2015, 4 pp.
European Patent App No. 12823751, Extended European Search Report, dated Jul. 22, 2015, 10 pp.

* cited by examiner

INTERFERENCE CANCELLATION METHOD AND APPARATUS FOR ENHANCED PHYSICAL DOWNLINK CONTROL CHANNEL

TECHNICAL FIELD

The present invention relates to interference cancellation for a physical downlink control channel PDCCH, and more particularly to an interference cancellation method for an enhanced physical downlink control channel E-PDCCH.

TECHNICAL BACKGROUND

The enhanced physical downlink control channel (E-PDCCH) has been discussed in 3GPP as a potential technical solution to enhance the PDCCH coverage and capacity. The fundamental requirements of the E-PDCCH lie in not only supporting beamforming on a PDCCH, but also supporting multi-user multi-input/multi-output (MU-MIMO). However, it will bring two problems, i.e., inter-cell interference (ICI) caused by the beamforming, and multi-user interference (MUI) caused by the multi-user multi-input/multi-output. Due to the instability of the MUI and ICI, for example, a change of the ICI within 5 ms may exceed 20 dB over some bandwidths, which is hardly to be predicted such that it is almost impossible for a PDCCH to select an appropriate aggregation level to guarantee a target block error rate (BLER).

In order to guarantee the target block error rate, a plurality of encoding rates might be required, one of which is based on the aggregation level of control channel elements (CCEs). A CCE is composed of 9 resource element groups (REG), each being composed of 4 resource elements. In the prior art, four CCE aggregation levels are prescribed, i.e., N=1, 2, 4, 8. These four CCE aggregation levels play a role of cyclically and repetitively encoding. However, it is hard for an eNodeB to predict the magnitude of MUI and ICI on the next PDCCH. Therefore, it would be impossible to provide an appropriate aggregation level to guarantee the target BLER. Because PDCCH resources are very important, it is required to select an appropriate aggregation level to cancel the MUI and ICI on the PDCCH. Once the MUI and ICI on the PDCCH are cancelled, the problem of instable interference on the PDCCH will be resolved.

SUMMARY OF THE INVENTION

In view of the problems existing in the prior art, embodiments of the present invention provide an interference cancellation method and apparatus for an enhanced physical downlink control channel.

According to one aspect of the present invention, there is provided an interference cancellation method for an enhanced physical downlink control channel E-PDCCH, comprising steps of:
(1) allocating different orthogonal covering code OCC sequences to different cells and/or different users; and
(2) combining a plurality of control channel elements CCEs constituting one PDCCH respectively with a cell-specific OCC sequence and/or a user-specific OCC sequence so as to enable a user equipment to cancel interference on the PDCCH.

According to another aspect of the present invention, there is provided a method for allocating orthogonal covering codes OCCs in an enhanced physical downlink control channel E-PDCCH, comprising:

dividing all available OCC sequences into $L_N$ groups, each OCC sequence group being allocated to one cell; and
dividing the each OCC sequence group into $K_N$ sequences, each sequence being allocated to one user;
wherein when the OCC sequences are orthogonal sequences, $L_N \cdot K_N = N$, and when the OCC sequences are semi-orthogonal sequences, $L_N \cdot K_N > N$, where N denotes an aggregation level of a PDCCH.

According to a further aspect of the present invention, there is provided an interference cancellation apparatus for an enhanced physical downlink control channel E-PDCCH, comprising:
an allocating device configured to allocate different orthogonal covering code OCC sequences to different cells and/or different users; and
a combining device configured to combine a plurality of control channel elements CCEs constituting one PDCCH respectively with a cell-specific OCC sequence and/or a user-specific OCC sequence so as to enable a user equipment to cancel interference on the PDCCH.

According to a still further aspect of the present invention, there is provided an apparatus for allocating orthogonal covering codes OCCs in an enhanced physical downlink control channel E-PDCCH, comprising:
a first allocating device configured to divide all available OCC sequences into $L_N$ groups, each OCC sequence group being allocated to one cell; and
a second allocating device configured to divide the each OCC sequence group into $K_N$ sequences, each sequence being allocated to one user;
wherein when the OCC sequences are orthogonal sequences, $L_N \cdot K_N = N$, and when the OCC sequences are semi-orthogonal sequences, $L_N \cdot K_N > N$, where N denotes an aggregate level of a PDCCH.

BRIEF DESCRIPTION OF THE DRAWINGS

The other objectives and effects of the present invention will become more obvious and comprehensible with more thorough understanding of the present invention through the following description with reference to the accompanying drawings, wherein.

DETAILED DESCRIPTION OF EMBODIMENTS

Figure 1:
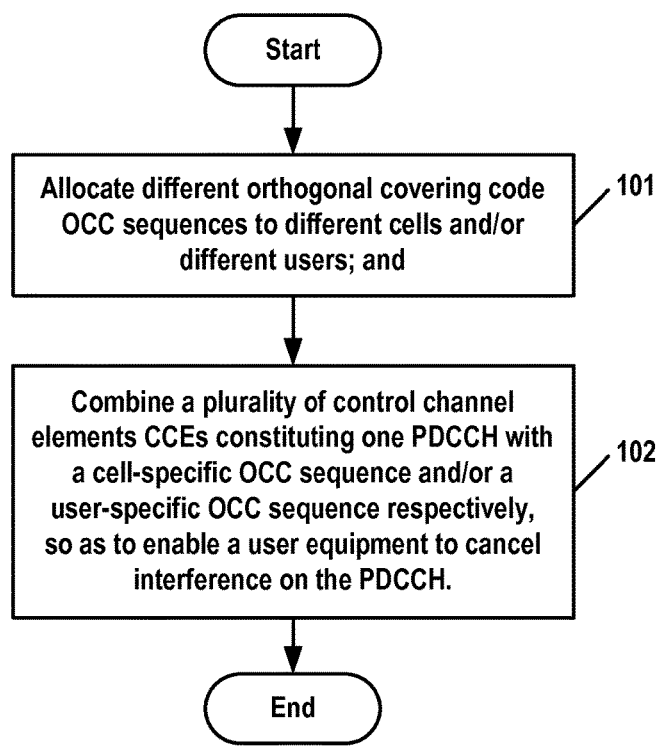
FIG. 1 shows a flow chart of an interference cancellation method for an E-PDCCH according to the embodiments of the present invention.

Hereinafter, more detailed explanations and illustrations will be made to the embodiments of the present invention with reference to the accompanying drawings. It should be understood that the drawings and embodiments of the present invention are only for exemplary purposes, but not intended to limit the protection scope of the present invention.

The flowcharts and block diagrams in the accompanying drawings illustrate possibly implemented system architectures, functionality, and operations of the system, method, and apparatus according to various embodiments of the present invention. In this regard, each block in the flowcharts or block diagrams may represent a module, a program segment, or a portion of a code, wherein the module, the program segment, or the portion of the code includes one or more executable instructions for implementing a prescribed logic function. It should also be noted that in some alternative implementations, the functionality marked in a block may also occur in a sequence different from what is marked in the drawings. For example, two successively illustrated blocks may be actually performed substantially in parallel, or in a reverse order sometimes, dependent on the involved functionality. It should also be noted that each block in the block diagrams and/or flowcharts and a combination of blocks in the block diagrams and/or flowcharts may be implemented by a dedicated hardware-based system for executing a prescribed function or operation or by a combination of dedicated hardware and computer instructions.

In the present invention, user equipments (UEs) may be various types of terminals, for example, mobile phones, personal digital assistants (PDAs), portable computers, etc. An eNodeB may be a base station or an eNB, etc.

The other features and advantages of the present invention will become more apparent through the following depiction of specific embodiments that illustrate the principle of the present invention with reference to the accompanying drawings.

In the embodiments of the present invention, control channel elements (CCEs) and orthogonal covering codes (OCCs) are employed to cancel MUI and ICI on a PDCCH. It is already known that the OCC is a concept of code-division multiplexing (CDMA), which uses different orthogonal codes to cancel interference.

FIG. 1 shows a flow chart of an interference cancellation method for an E-PDCCH according to the embodiments of the present invention. As illustrated in FIG. 1, in step 101, an eNodeB allocates different orthogonal covering code OCC sequences to different cells and/or different users. In step 102, a plurality of control channel elements CCEs constituting one PDCCH are combined respectively with a cell-specific OCC sequence and/or a user-specific OCC sequence so as to enable a user equipment to cancel interference on the PDCCH.

According to one embodiment of the present invention, in step 102, the plurality of CCEs constituting one PDCCH are multiplied by the cell-specific OCC sequence and/or the user-specific OCC sequence respectively, so as to enable the user equipment to cancel the interference on the PDCCH through a de-correlation operation.

According to one embodiment of the present invention, the plurality of CCEs constituting one PDCCH are multiplied respectively by the cell-specific OCC sequence and/or the user-specific OCC sequence through the following function:

$$[CCE_1\ CCE_2\ \ldots\ CCE_N] \rightarrow [CCE_1 \cdot s_1\ CCE_2 \cdot s_2\ \ldots\ CCE_N \cdot s_N],$$

wherein $CCE_n$ denotes PDCCH data accommodated by the nth CCE with an aggregation level of N, and $[s_1\ s_2\ \ldots\ s_N]$ is the OCC sequence. In the embodiments of the present invention, a plurality of CCEs inside one PDCCH are repetitively coded, i.e., completely identical.

According to one embodiment of the present invention, the aggregation level is N=1, 2, 4, 8.

According to one embodiment of the present invention, where the eNodeB has 3 or 6 cells, it is required to cancel ICI in 3 sites. A variable aggregation level may be introduced, for example, N may be 3, 6, etc.

In the embodiments of the present invention, the eNodeB sends the generated $CCE_1 \cdot s_1, CCE_2 \cdot s_2, \ldots, CCE_n \cdot s_n$ to the UE. The UE, after receiving the $CCE_1 \cdot s_1, CCE_2 \cdot s_2, \ldots CCE_n \cdot s_n$, performs a de-correlation operation, i.e., multiplies $CCE_1 \cdot s_1$ by a conjugate transpose of $s_1$, multiplies $CCE_2 \cdot s_2$ by the conjugate transpose of $s_2$ and multiplies $CCE_n \cdot s_n$ by the conjugate transpose of $s_n$, thereby obtaining $CCE_1$, $CCE_2, \ldots, CCE_n$. Then, $CCE_1, CCE_2, \ldots, CCE_n$ are subjected to combining and channel decoding.

In the above embodiments, positions of the plurality of aggregated CCEs of one PDCCH should be relatively fixed. In a traditional PDCCH, one CCE may belong to a plurality of PDCCHs, which may influence the blocking rate of the PDCCH to a certain extent. However, the aggregated CCEs being relatively fixed can reduce the times of blind decoding, and during MU-MIMO transmission, it may compensate potentially increased blocking rate of the PDCCH by being multiplied by the OCC sequence.

Generally, an OCC-based solution according to the embodiments of the present invention is mainly directed to a narrow-band CCE structure. Compared with a distributed CCE (which uses a scrambled resource element group), it may have a higher beamforming gain.

In addition to a frequency-division multiplexing (FDM)-EPDCCH solution, the embodiments of the present invention can also applied to a time-division multiplexing (TDM)-EPDCCH solution. For example, non-interleaved PDCCH OFDM symbols may be supported in a manner similar to a "Multicast/Broadcast Single Frequency Network (MBSFN)." Then, the CCEs are located in a continuous bandwidth, which provides a possibility to use the OCCs.

In addition, in a frequency-selective channel, the E-PDCCH bandwidth depends on extended OFDM symbols for the E-PDCCH, for example, if 2 OFDM symbols are employed, 6 PRBs can support an OCC sequence with a length of 4.

Hereinafter, how to allocate corresponding OCC sequences for different cells and different users will be described.

In the embodiments of the present invention, in order to cancel ICI and MUI, there is provided a method for allocating OCCs in an E-PDCCH.

Figure 2:
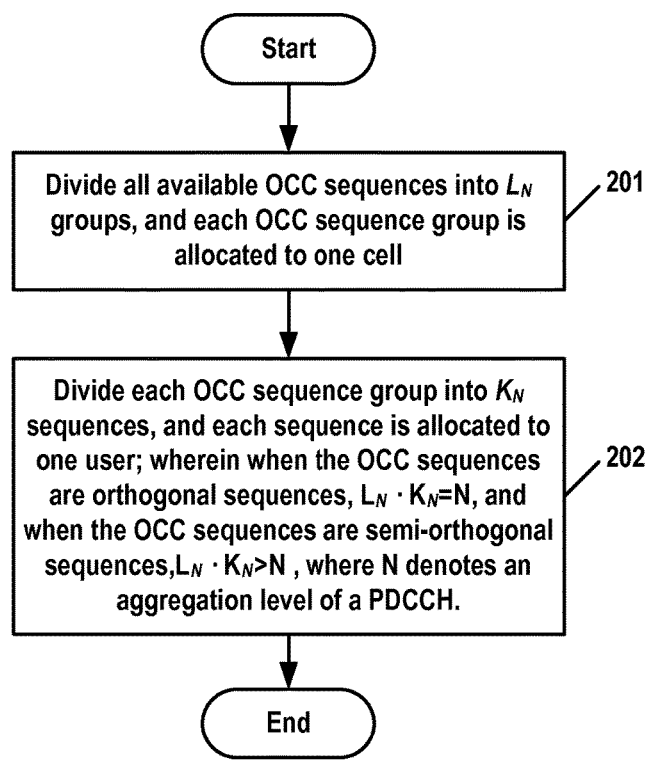
FIG. 2 shows a flow chart of a method for allocating OCCs in an E-PDCCH according to the embodiments of the present invention.

FIG. 2 illustrates a method for allocating OCCs in an E-PDCCH according to the embodiments of the present invention. As illustrated in FIG. 2, in step 201, an eNodeB divides all available OCC sequences into $L_N$ groups, and each OCC sequence group is allocated to one cell. In step 202, each OCC sequence group is divided into $K_N$ sequences, and each sequence is allocated to one user to support the MU-MIMO transmission, wherein when the OCC sequences are orthogonal sequences, $L_N \cdot K_N = N$, and when the OCC sequences are semi-orthogonal sequences, $L_N \cdot K_N > N$, where N is the aggregate level of the PDCCH.

Hereinafter, a method for allocating corresponding OCC sequence groups to different cells according to the embodiments of the present invention is described.

According to one embodiment of the present invention, a corresponding OCC sequence group is allocated to a target cell according to the following equation:

$$G = \text{Mod}(\text{cellID}, L_N) \text{ or } \text{Mod}(\text{cellID} + \text{SFN}, L_N),$$

wherein G denotes the OCC sequence group corresponding to the target cell, cellID denotes an identifier of the target cell, and SFN denotes a system frame number.

Figure 3:
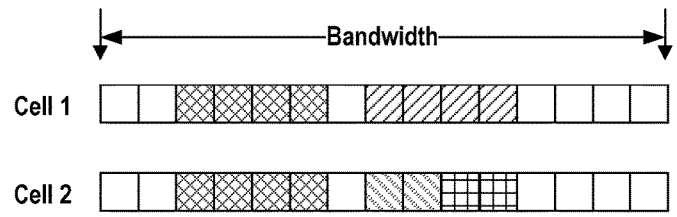
FIG. 3 shows a schematic diagram of inter-cell E-PDCCH scheduling according to the embodiments of the present invention.

FIG. 3 shows a schematic diagram of inter-cell E-PDCCH scheduling according to the embodiments of the present invention. As illustrated in FIG. 3, the CCEs of adjacent cells should be located in the same bandwidth.

According to one embodiment of the present invention, when the OCC sequences are orthogonal sequences, the aggregation levels of the same time-frequency resources of the adjacent cells needn't to be the same. In FIG. 3, the aggregation level as shown by 4 blocks in the right side of cell 1 is 4, and at this point, the CCEs in cell 1 may be allocated with OCCs [1 1 1 1] and [1 1 −1 −1]. The aggregation level as shown by the 4 blocks in the right side of cell 2 is 2, and at this point, the CCEs in cell 2 may be allocated with [ 1 −1] and [1 −1].

Figure 4:
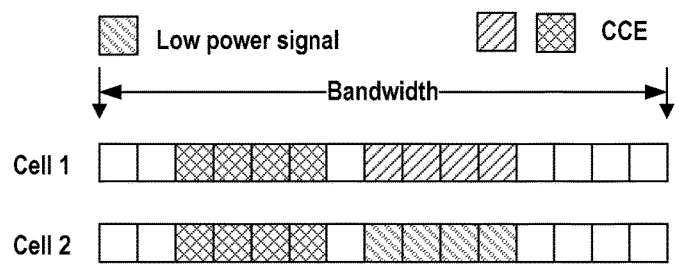
FIG. 4 shows a schematic diagram of reducing ICI by using low/zero power signals according to the embodiments of the present invention.

FIG. 4 shows a schematic diagram of reducing ICI by using low/zero power signals according to the embodiments of the present invention. As illustrated in FIG. 4, for a cell center UE, a PDCCH may be transmitted on cell 1, while on cell 2, low/zero power signals are employed to transmit a Physical Downlink Shared Channel (PDSCH) without affecting the PDCCH transmitted on the cell 1, thereby reducing the inter-cell interference (ICI).

Hereinafter, a method for allocating corresponding OCC sequences to different users according to the embodiments of the present invention is described.

According to one embodiment of the present invention, a corresponding OCC is allocated to a target user according to the following equation:

$$U = \text{Mod}(P, K_N),$$

wherein U denotes the OCC sequence corresponding to the target user, and P denotes an index of a Demodulation Reference Signal (DMRS) antenna port allocated to the target user.

According to one embodiment of the present invention, the DMRS antenna port is informed to the UE using the $9^{th}$ REG or a traditional PDCCH.

According to one embodiment of the present invention, when the OCC sequences are orthogonal sequences, the aggregation levels of multiple users needn't to be the same.

Then, the index of the finally employed OCC for the target user is $G \cdot K_N + U$.

According to one embodiment of the present invention, when the number of OCC sequences is limited, blind detection may be employed to enable the UE to obtain a corresponding OCC sequence. Specifically, the eNodeB does not inform the UE of the allocated OCC sequence. At this point, the UE tests all possible OCC sequences and obtains the allocated OCC sequence through a check bit included in the CCE.

In the embodiments of the present invention, when the aggregation level is an integer power of 2, a binary sequence, for example, a Walsh function may be used to generate the OCC sequence. When the aggregation level is not an integer power of 2, a non-binary sequence, for example, a Zad-off Chu sequence may be used to generate the OCC sequence.

It is already noted that the variables $L_N$, $K_N$ would significantly affect the E-PDCCH capacity. Hereinafter, a method for optimizing variables $L_N$, $K_N$ according to the embodiments of the present invention will be described.

A direct manner is a frequency-independent manner, for example, configuring $L_N$, $K_N$ via for example predefined or broadcasted notification. However, considering cell center UEs and cell edge UEs generally experience varied interference, the embodiments of the present invention provide the following technical solution:

(1) for the cell center UEs, increasing $K_N$ and decreasing $L_N$, since the MUI overwhelms the ICI usually, for example $K_N = N$, $L_N = 1$;

(2) for the cell edge UEs, increasing $L_N$ and decreasing $K_N$, since the ICI overwhelms the MUI usually, for example $L_N = N/2$, $K_N = 2$.

In addition, the UEs performing the MU-MIMO transmission should have the same $L_N$, $K_N$ values, so as to avoid potential confusion.

Figure 5:
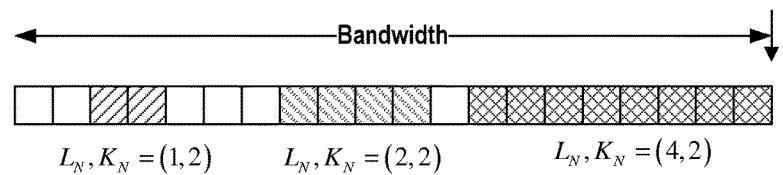
FIG. 5 shows a schematic diagram of allocating frequency-related $L_N$, $K_N$ according to the embodiments of the present invention.

FIG. 5 shows a schematic diagram of allocating frequency-related $L_N$, $K_N$ according to the embodiments of the present invention. As illustrated in FIG. 5, for a cell center UE, $L_N$ is 1 and $K_N$ is 2. For a cell edge UE, $L_N$ is increased to 4 and $K_N$ is 2. Moreover, power adjustment may be used, for example, the bandwidth allocated to the cell center UE may be equipped with lower transmitting power, while the bandwidth for the cell edge UE may be equipped with higher transmitting power.

It is already found in system-level simulation that the MUI/ICI observed at UE side is extremely unfixed, for example, a change of 20 dB occurs during 5 ms. With the embodiments of the present invention, the OCC resources may be flexibly applied to the cell center UEs and cell edge UEs, which face varied type of interference. Moreover, power allocation is a supplementary solution, which can also relieve the interference.

Figure 6:
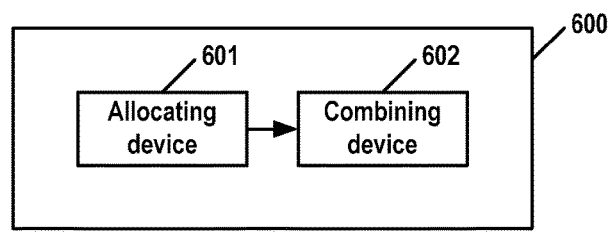
FIG. 6 shows a block diagram of an interference cancellation apparatus 600 for an E-PDCCH according to the embodiments of the present invention.

FIG. 6 shows a block diagram of an interference cancellation apparatus 600 for an E-PDCCH according to the embodiments of the present invention. As illustrated in FIG. 6, the interference cancellation apparatus 600 comprises an allocating device 601 and a combining device 602. The allocating device 601 is configured to allocate different orthogonal covering code OCC sequences to different cells and/or different users. The combining device 602 is configured to combine a plurality of control channel elements CCEs constituting one PDCCH respectively with a cell-specific OCC sequence and/or a user-specific OCC sequence so as to enable a user equipment to cancel interference on the PDCCH.

According to one embodiment of the present invention, the combining device 602 is configured to multiply the plurality of CCEs constituting one PDCCH respectively by the cell-specific OCC sequence and/or the user-specific OCC sequence so as to enable the user equipment to cancel interference on the PDCCH.

According to one embodiment of the present invention, the plurality of CCEs constituting one PDCCH are multiplied respectively by the cell-specific OCC sequence and/or the user-specific OCC sequence through the following function:

$$[CCE_1 \, CCE_2 \ldots CCE_N] \rightarrow [CCE_1 \cdot s_1 \, CCE_2 \cdot s_2 \ldots CCE_N \cdot s_N],$$

wherein n denotes PDCCH data accommodated by the nth CCE with an aggregation level of N, and [$s_1$ $s_2$ ... $s_N$] denotes the OCC sequence.

Figure 7:
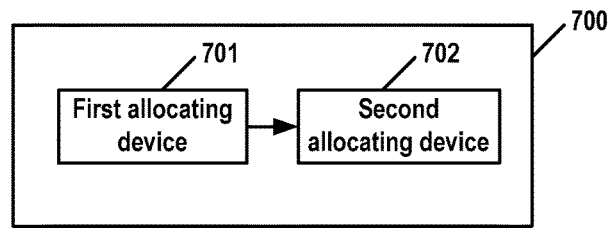
FIG. 7 shows a block diagram of an apparatus 700 for allocating OCCs in an E-PDCCH according to the embodiments of the present invention.

FIG. 7 shows a block diagram of an apparatus 700 for allocating OCCs in an E-PDCCH according to the embodiments of the present invention. As illustrated in FIG. 7, the apparatus 700 comprises a first allocating device 701 and a second allocating device 702. The first allocating device 701 is configured to divide all available OCC sequences into $L_N$ groups, and each group of the OCC sequences is allocated to one cell. The second allocating device 702 is configured to divide each group of the OCC sequences into $K_N$ sequences, and each sequence is allocated to one user. In this embodiment, when the OCC sequences are orthogonal sequences, $L_N \cdot K_N = N$, and when the OCC sequences are semi-orthogonal sequences, $L_N \cdot K_N > N$, where N denotes the aggregate level of a PDCCH.

According to one embodiment of the present invention, the first allocating device 701 allocates a corresponding group of the OCC sequences to a target cell according to the following equation:

$$G = \mathrm{Mod}(\mathrm{cellID}, L_N) \text{ or } \mathrm{Mod}(\mathrm{cellID} + \mathrm{SFN}, L_N),$$

wherein G denotes the OCC sequence group corresponding to the target cell, cellID denotes an identifier of the target cell, and SFN denotes a system frame number.

According to one embodiment of the present invention, when the OCC sequences are orthogonal sequences, the aggregation levels of the same time-frequency resources of adjacent cells are not the same.

According to one embodiment of the present invention, the second allocating device 702 allocates a corresponding OCC to a target user according to the following equation:

$$U = \mathrm{Mod}(P, K_N),$$

wherein U denotes an OCC sequence corresponding to the target user, and P denotes the index of a Demodulation Reference Signal antenna port allocated to the target user.

According to one embodiment of the present invention, when the OCC sequences are orthogonal sequences, the aggregation levels of multiple users are not the same.

According to one embodiment of the present invention, when the number of OCC sequences is limited, the target user obtains a corresponding OCC sequence through blind detection.

According to one embodiment of the present invention, for a cell center user equipment, $K_N$ is increased and $L_N$ is decreased; and for a cell edge user equipment, $L_N$ is increased and $K_N$ is decreased.

It should be noted that the method as disclosed in the embodiments of the present invention may be implemented in software, hardware, or a combination of software and hardware. The hardware part may be implemented with a dedicated logic; and the software part may be stored in a memory and executed by an appropriate instruction executing system, for example a microprocessor, a personal computer (PC) or a mainframe. In some embodiments, the present invention is embodied as software, including, but not limited to, firmware, resident software, micro-code, etc.

Moreover, the embodiments of the present invention may be embodied in the form of a computer program product usable by computers or accessible by computer-readable media that provide program codes for use by or in connection with a computer or any instruction executing system. For the purpose of description, a computer-usable or computer-readable medium may be any tangible device that can contain, store, communicate, propagate, or transport the program for use by or in connection with an instruction executing system, apparatus, or device.

The medium may be an electric, magnetic, optical, electromagnetic, infrared, or semiconductor system (or apparatus or device), or a propagation medium. Examples of the computer-readable medium include a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), a compact disk-read/write (CD-R/W), and a DVD.

It should be noted that in order to make the embodiments of the present invention more comprehensible, the above description omits some more specific technical details which are known to the skilled in the art and may be essential to implement the present invention. The purpose for providing the description of the present invention lies in explanation and illustration, but not to exhaust or limit the present invention within the disclosed form. To a person with normal skills in the art, various modifications and alternations are obvious.

Thus, selecting and describing the embodiments is to better illustrate the principle and practical application of the present invention and to enable a person with normal skills in the art to appreciate that without departing from the spirit of the present invention, all modifications and variations fall within the protection scope of the present invention as limited by the appending claims.

What is claimed is:

1. An interference cancellation method for an enhanced physical downlink control channel (E-PDCCH), comprising:
    allocating different orthogonal covering code (OCC) sequences to different cells; and
    combining a plurality of control channel elements (CCEs) constituting one PDCCH by a cell-specific OCC sequence so as to enable a user equipment to cancel interference on the PDCCH.

2. The method according to claim 1, wherein combining comprises:
    multiplying the plurality of CCEs constituting one PDCCH by the cell-specific OCC sequence so as to enable the user equipment to cancel the interference on the PDCCH.

3. The method according to claim 2, wherein the plurality of CCEs constituting one PDCCH are multiplied by the cell-specific OCC sequence through the following function:

$$[CCE_1\ CCE_2\ \ldots\ CCE_N] \rightarrow [CCE_1 {}^*s_1\ CCE_2 {}^*s_2 \ldots CCE_N {}^*s_N],$$

wherein $CCE_n$ denotes PDCCH data accommodated by the $n^{th}$ CCE with an aggregation level of N, and [$s_1$ $s_2$ ... $s_N$] denotes the OCC sequence.

4. The method according to claim 1 further comprising:
    allocating the different OCC sequences to different users; and
    combining the plurality of CCEs constituting the one PDCCH by a user-specific OCC sequence so as to enable the user equipment to cancel interference on the PDCCH.

5. The method according to claim 4, wherein combining comprises:
    multiplying the plurality of CCEs constituting one PDCCH by the user-specific OCC sequence so as to enable the user equipment to cancel the interference on the PDCCH.

6. The method according to claim 5, wherein the plurality of CCEs constituting one PDCCH are multiplied by the user-specific OCC sequence through the following function:

$$[CCE_1\ CCE_2\ \ldots\ CCE_N] \rightarrow [CCE_1{}^*s_1\ CCE_2{}^*s_2\ \ldots\ CCE_N{}^*s_N],$$

wherein $CCE_n$ denotes PDCCH data accommodated by the $n^{th}$ CCE with an aggregation level of N, and $[s_1\ s_2\ \ldots\ s_N]$ denotes the OCC sequence.

7. An interference cancellation apparatus for an enhanced physical downlink control channel (E-PDCCH), comprising:
  an allocating device configured to allocate different orthogonal covering code (OCC) sequences to different cells; and
  a combining device configured to combine a plurality of control channel elements (CCEs) constituting one PDCCH with a cell-specific OCC sequence so as to enable a user equipment to cancel interference on the PDCCH.

8. The apparatus according to claim 7, wherein the combining device is configured to multiply the plurality of CCEs constituting one PDCCH by the cell-specific OCC sequence so as to enable the user equipment to cancel the interference on the PDCCH.

9. The apparatus according to claim 8, wherein the plurality of CCEs constituting one PDCCH are multiplied by the cell-specific OCC sequence through the following function:

$$[CCE_1\ CCE_2\ \ldots\ CCE_N] \rightarrow [CCE_1{}^*s_1\ CCE_2{}^*s_2\ \ldots\ CCE_N{}^*s_N],$$

wherein $CCE_n$ denotes PDCCH data accommodated by the $n^{th}$ CCE with an aggregation level of N, and $[s_1\ s_2\ \ldots\ s_N]$ denotes the OCC sequence.

10. The apparatus according to claim 7, wherein the allocating device is configured to allocate the different OCC sequences to different users;
  wherein the combining device is configured to combine the plurality of CCEs constituting one PDCCH with the user-specific OCC sequence so as to enable the user equipment to cancel the interference on the PDCCH.

11. An interference cancellation method for an enhanced physical downlink control channel (E-PDCCH), comprising:
  allocating different orthogonal covering code (OCC) sequences to different users; and
  combining a plurality of control channel elements (CCEs) constituting one PDCCH by a user-specific OCC sequence so as to enable a user equipment to cancel interference on the PDCCH.

12. The method according to claim 11, wherein combining comprises:
  multiplying the plurality of CCEs constituting one PDCCH by the user-specific OCC sequence so as to enable the user equipment to cancel the interference on the PDCCH.

13. The method according to claim 12, wherein the plurality of CCEs constituting one PDCCH are multiplied by the user-specific OCC sequence through the following function:

$$[CCE_1\ CCE_2\ \ldots\ CCE_N] \rightarrow [CCE_1{}^*s_1\ CCE_2{}^*s_2\ \ldots\ CCE_N{}^*s_N],$$

wherein $CCE_n$ denotes PDCCH data accommodated by the $n^{th}$ CCE with an aggregation level of N, and $[s_1\ s_2\ \ldots\ s_N]$ denotes the OCC sequence.

14. The method according to claim 13 further comprising:
  allocating the different OCC sequences to different cells; and
  combining the plurality of CCEs constituting the one PDCCH by a cell-specific OCC sequence so as to enable the user equipment to cancel interference on the PDCCH.

15. The method according to claim 14, wherein combining comprises:
  multiplying the plurality of CCEs constituting one PDCCH by the cell-specific OCC sequence so as to enable the user equipment to cancel the interference on the PDCCH.

16. The method according to claim 15 wherein the plurality of CCEs constituting one PDCCH are multiplied by the cell-specific OCC sequence through the following function:

$$[CCE_1\ CCE_2\ \ldots\ CCE_N] \rightarrow [CCE_1{}^*s_1\ CCE_2{}^*s_2\ \ldots\ CCE_N{}^*s_N],$$

wherein $CCE_n$ denotes PDCCH data accommodated by the $n^{th}$ CCE with an aggregation level of N, and $[s_1\ s_2\ \ldots\ s_N]$ denotes the OCC sequence.

17. An interference cancellation apparatus for an enhanced physical downlink control channel (E-PDCCH), comprising:
  an allocating device configured to allocate different orthogonal covering code (OCC) sequences to different users; and
  a combining device configured to combine a plurality of control channel elements (CCEs) constituting one PDCCH with a user-specific OCC sequence so as to enable a user equipment to cancel interference on the PDCCH.

18. The apparatus according to claim 17, wherein the combining device is configured to multiply the plurality of CCEs constituting one PDCCH by the user-specific OCC sequence so as to enable the user equipment to cancel the interference on the PDCCH.

19. The apparatus according to claim 18, wherein the plurality of CCEs constituting one PDCCH are multiplied by the user-specific OCC sequence respectively through the following function:

$$[CCE_1\ CCE_2\ \ldots\ CCE_N] \rightarrow [CCE_1{}^*s_1\ CCE_2{}^*s_2\ \ldots\ CCE_N{}^*s_N],$$

wherein $CCE_n$ denotes PDCCH data accommodated by the $n^{th}$ CCE with an aggregation level of N, and $[s_1\ s_2\ \ldots\ s_N]$ denotes the OCC sequence.

20. The apparatus according to claim 17, wherein the allocating device is configured to allocate the different OCC sequences to different cells;
  wherein the combining device is configured to combine the plurality of CCEs constituting one PDCCH with the cell-specific OCC sequence so as to enable the user equipment to cancel the interference on the PDCCH.

* * * * *